US007120610B1

(12) United States Patent
Brookner et al.

(10) Patent No.: US 7,120,610 B1
(45) Date of Patent: Oct. 10, 2006

(54) TECHNIQUE FOR EFFECTIVE MANAGEMENT OF RESOURCE CONSUMPTION

(75) Inventors: George M. Brookner, Norwalk, CT (US); Alex L. Yip, Briarwood, NY (US); Brian T. Leary, Milford, CT (US)

(73) Assignee: Ascom Hasler Mailing Systems, Inc., Shelton, CT (US)

( * ) Notice: Subject to any disclaimer, the term of this patent is extended or adjusted under 35 U.S.C. 154(b) by 0 days.

(21) Appl. No.: 09/914,753

(22) PCT Filed: Feb. 11, 2000

(86) PCT No.: PCT/US00/03585

§ 371 (c)(1),
(2), (4) Date: Dec. 3, 2001

(87) PCT Pub. No.: WO00/52614

PCT Pub. Date: Sep. 8, 2000

(51) Int. Cl.
*G07B 17/02* (2006.01)
*G06F 17/00* (2006.01)

(52) U.S. Cl. ........................................ 705/401; 705/60

(58) Field of Classification Search ............ 705/60–63, 705/400–416; 700/1–20, 99, 108, 231–232
See application file for complete search history.

(56) References Cited

U.S. PATENT DOCUMENTS 3,792,446 A * 2/1974 McFiggins et al. ......... 705/403
4,069,675 A * 1/1978 Adler et al. .................. 60/667
4,525,786 A * 6/1985 Crowley et al. ............ 705/410
4,783,748 A 11/1988 Swarztrauber et al. ...... 364/483
4,811,011 A 3/1989 Sollinger ............... 340/870.02
4,833,618 A 5/1989 Verma et al. ............... 364/483
5,142,566 A 8/1992 Meschi ........................ 379/98
5,173,935 A 12/1992 Meschi ........................ 379/98

(Continued)

FOREIGN PATENT DOCUMENTS

EP 0048746 B1 4/1982

(Continued)

OTHER PUBLICATIONS

Derrick, "The Meter is Running", Office Systems v11n9, pp. 32-40, ISSN: 8750-3441.*

(Continued)

*Primary Examiner*—Mary D. Cheung
(74) *Attorney, Agent, or Firm*—Kenyon & Kenyon LLP

(57) ABSTRACT

In an arrangement for accounting for consumption of a resource, e.g., utilization of a postal service or utilities, a data center (503, 803) periodically communicates with multiple franking systems (100, 505-1, 505-2, **505-*n*) dispensing postage for the postal service utilization. The data center (503, 803) receives transaction records (301, 303, 305, 307, 309), where a transaction record (301, 303, 305, 307, 309) is associated with each transaction performed by the franking system (100, 505-1, 505-2, 505-*n*) in each period. Each record (301, 303, 305, 307, 309) includes at least the postage dispensed (305) in the associated franking transaction, and an ascending register value (307) indicating the cumulative postage dispensed. Using the received records (301, 303, 305, 307, 309), the data center (503, 803) assesses the charges during the period and causes assessed charges to be charged to an account associated with the franking system (100, 505-1, 505-2, 505-*n*). In addition, the data center (503, 803) forwards a copy of the received records (301, 303, 305, 307, 309) to another system (507, 550, 565, 850, 865**) for storage, which may be used by the postal authority or utility to audit the charges.

52 Claims, 5 Drawing Sheets

U.S. PATENT DOCUMENTS

| | | | | | |
|---|---|---|---|---|---|
| 5,197,095 | A | | 3/1993 | Bonnet et al. | 379/107 |
| 5,224,046 | A | * | 6/1993 | Kim et al. | 705/403 |
| 5,367,464 | A | * | 11/1994 | Abumehdi et al. | 705/403 |
| 5,701,250 | A | * | 12/1997 | Wilson | 705/403 |
| 5,715,164 | A | | 2/1998 | Liechti et al. | 364/464.2 |
| 5,819,239 | A | * | 10/1998 | Berson et al. | 705/403 |
| 5,994,892 | A | | 11/1999 | Turino et al. | 324/142 |
| 6,010,069 | A | * | 1/2000 | Debois | 235/380 |
| 6,064,992 | A | * | 5/2000 | Herring | 705/403 |

FOREIGN PATENT DOCUMENTS

| | | | | |
|---|---|---|---|---|
| EP | 0 373 970 | | | 6/1990 |
| EP | 0 504 843 | | | 9/1992 |
| EP | 927963 | A2 | * | 7/1999 |
| GB | 2 251 210 | | | 7/1992 |
| WO | WO 98/57302 | | | 12/1998 |

OTHER PUBLICATIONS

Japanese Patent Document No. JP 5-136903, English Translation of the Abstract attached.

"Information-Based Indicia Program (IBIP); Performance Criteria for Information-Based Indicia and Security Architecture for Closed IBI Postage Metering Systems" United States Postal Service, Jan. 12, 1999.

* cited by examiner

TECHNIQUE FOR EFFECTIVE MANAGEMENT OF RESOURCE CONSUMPTION

This application claims the benefit of the earlier filed International Application No. PCT/US00/03585, International Filing Date, 11 Feb. 2000, which designated the United States of America, and which international application was published under PCT Article 21(2) in English as WO Publication No. WO 00/52614.

TECHNICAL FIELD

The invention relates to resource management techniques, and more particularly to a technique for accounting for consumption of a resource, e.g., utilization of a postal service.

BACKGROUND OF THE INVENTION

Postage representing payment for a postal service makes up a significant portion of expenses of many businesses. For example, an insurance company routinely sends a large number of bills and correspondence to customers via mail, thereby incurring substantial postage.

To facilitate mailing of a large volume of mail, a franking system is often employed to frank, on mailpieces, postage indicia which serve as proof of postage. One such franking system may be a postage meter, or general purpose computer equipment, e.g., a personal computer (PC), having appropriate software installed therein for printing postage indicia using a local/network printer.

To secure accounting of postage dispensation, some postal authorities, e.g., the United States Postal Service (USPS), advocate use of a postal security device (PSD) in a franking system. For example, the USPS promulgated specifications for the design of the PSD under an Information-Based Indicia Program (IBIP).

In general, a PSD has a secure housing, and within the secure housing are accounting registers and a cryptographic engine. These accounting registers typically include an ascending register and a descending register. As is well known, the ascending register is used to keep track of the amount of postage dispensed. On the other hand, the descending register is used to keep track of the amount of postage available for postage dispensation. The cryptographic engine is used to sign certain postal information contained in a postage indicium to authenticate the same, in accordance with a well known public key algorithm. One such public key algorithm may be the Digital Signature Algorithm (DSA) described, e.g., in "Digital Signature Standard (DSS)," *FIPS PUB* 186, May 19, 1994. The cryptographic engine also carries out cryptographic authentication and signing for communications of the PSD with a remote data center, which may be maintained by a party other than a postal authority, e.g., a postage metering equipment or service provider. Such communications may be used to set up and maintain the PSD, and to replenish the postage fund by adjusting the value of the descending register in the PSD, in accordance with a well known telemeter setting (TMS) technique.

SUMMARY OF THE INVENTION

We have recognized that the prior art use of the descending register to keep a postage fund in a PSD or franking system described above is inefficient. Specifically, in prior art, to avoid the inconvenience of performing the TMS frequently, e.g., daily, to adjust the descending register value to replenish the postage fund, a customer normally keeps the descending register value higher than the actual postage consumed each day. Depending on the volume of mail sent by the customer and the predictability of the mail volume, the descending register value can be significant, and the difference between the descending register value and the actual postage consumed each day may be substantial. We have recognized that such a difference represents undesirable illiquidity to the customer. For that matter, the prior art use of the descending register is totally undesirable as it causes the customer to commit a possibly large fund in the descending register which the customer has not spent for proof of payments, and does not even earn interest on.

In accordance with the invention, the customer is charged only for the postage franked. As a result, no fund is tied up in a descending register in a franking system. In fact, the need of use of the descending register may be completely obviated. Thus, in accordance with the invention, records of franking transactions performed by the franking system are communicated to a remote data center from time to time, e.g., periodically, to account for the postage franked in a reporting period. Each record includes at least (a) transaction time information, (b) the franking transaction amount, and (c) an ascending register value indicating the cumulative postage franked. Based on the received records, the data center assesses the postage dispensed during the reporting period. The data center causes charging the assessed postage to an account associated with the franking system. In addition, the data center forwards a copy of the received records to another system for storage, which may be audited by the postal authority. The inventive arrangement may similarly be employed to account for other resource consumptions such as utility consumptions. In that case, the utility provider may also re-allocate the resource in a timely fashion in response to the customer needs based on statistics derived from the received records. For example, extraordinary consumption could relate to a malfunction which may otherwise have gone unnoticed for an extended period of time.

BRIEF DESCRIPTION OF THE DRAWING

Further objects, features and advantages of the invention will become apparent from the following detailed description taken in conjunction with the accompanying drawing, in which.

DETAILED DESCRIPTION

Figure 1:
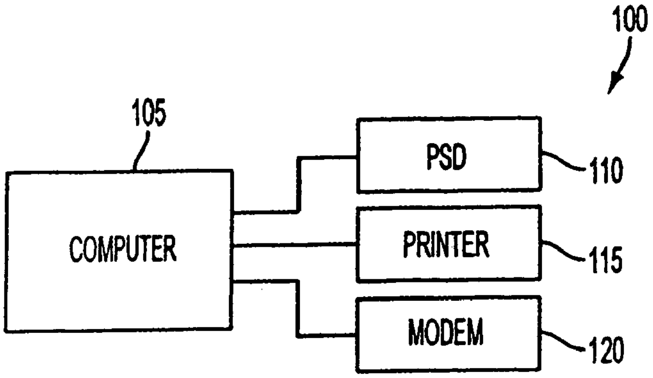
FIG. 1 is a block diagram of a franking system in accordance with the invention for conducting franking transactions to generate postage indicia.

FIG. 1 illustrates franking system 100 embodying the principles of the invention for generating postage indicia. In this particular illustrative embodiment, system 100 is configured as an "open system," where computer 105 may be a conventional personal computer (PC) serving as a host device, and where postal security device (PSD) 110, printer 115 for franking or printing postage indicia, and modem 120 are peripherals to computer 105. Alternatively, computer 105 may be a workstation or any other general purpose computing machine. In addition, modem 120 in this instance is shown as an external modem, it will be appreciated that any internal modem or network interface card (NIC) within computer 105 may be used, instead.

Figure 2:
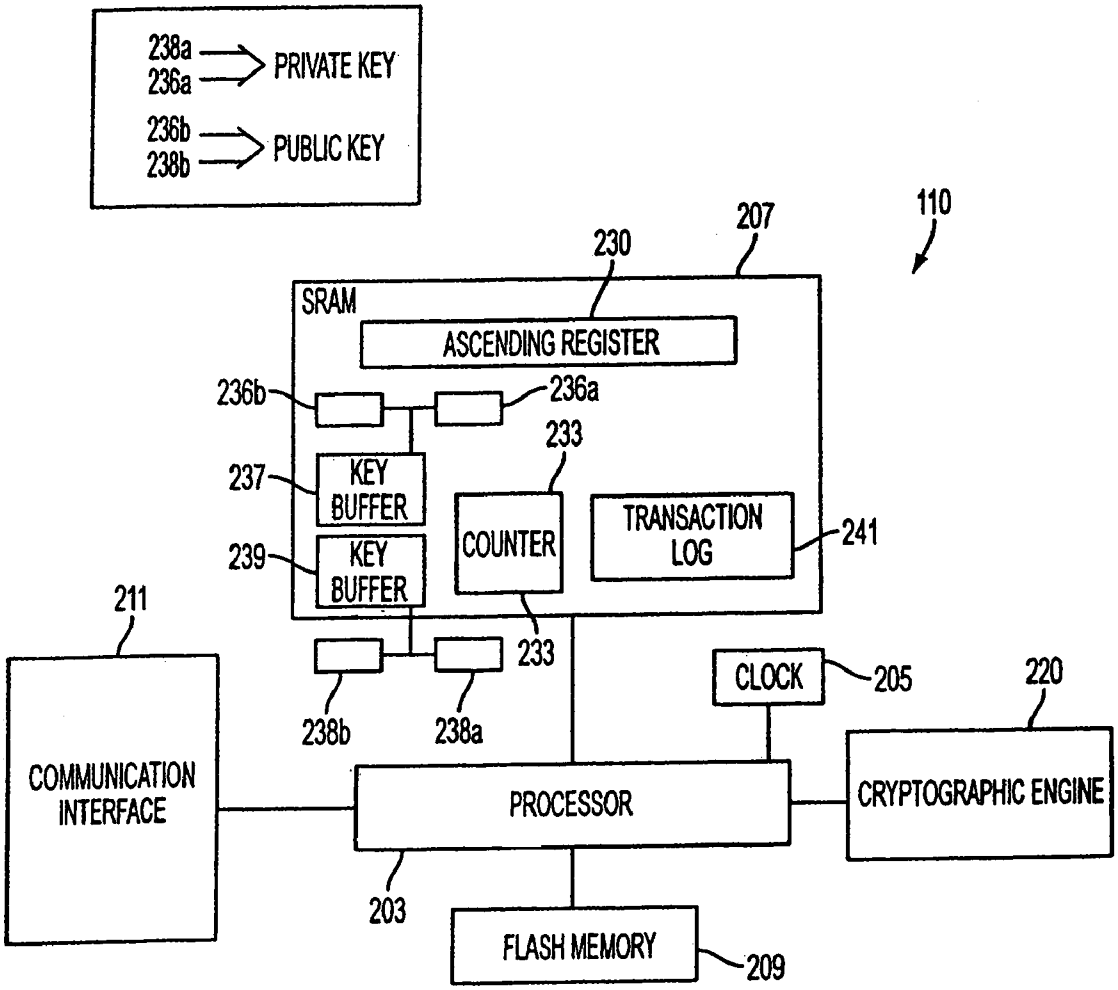
FIG. 2 is a block diagram of a postal security device (PSD) used in the franking system of FIG. 1.

FIG. 2 illustrates PSD 110 in accordance with the invention. PSD 110 may be secured by well known hardware protection means and other tamper-resistant methodologies. As shown in FIG. 2, PSD 110 comprises processor 203, clock 205, static random-access memory (SRAM) 207, a non-volatile memory, e.g., flash memory 209, communications interface 211 for interfacing with computer 105, and cryptographic engine 220.

In a prior art PSD, a descending register is used to keep track of the amount of postage available for postage dispensation. When the descending register value decreases over time below a predetermined limit, e.g., zero, a franking system can no longer dispense postage until the descending register is reset. Such a reset may be achieved by way of electronic funds transfer, in accordance with a well known telemeter setting (TMS) technique. However, to avoid the inconvenience of performing resets frequently, e.g., daily, a customer normally keeps the descending register value higher than the actual postage consumed each day. Depending on the volume of mail sent by the customer and the predictability of the mail volume, the descending register value can be significant, and the difference between the descending register value and the actual postage consumed each day may be substantial. We have recognized that such a difference represents undesirable illiquidity to the customer. For that matter, the prior art arrangement using a descending register to store an available postage fund is totally undesirable as it causes the customer to commit a possibly large fund in the descending register on which the customer does not even earn interest.

In a postage finance arrangement in accordance with the invention described below, the customer is charged only for the postage franked. As a result, no fund is tied up in a descending register in a franking system. In fact, the need of use of the descending register may be completely obviated. The inventive postage finance arrangement involves communications of records of franking transactions by the franking system to a remote data center to account for the postage franked.

Thus, in this illustrative embodiment, PSD 110 contains no descending register. SRAM 207 however stores an ascending register value in ascending register 230. As is well known, ascending register 230 is used to keep track of the amount of postage dispensed. SRAM 207 also stores a first pair of public key and private key in key buffer 237, a second pair of public key and private key in key buffer 239, transaction log 241 for recording past franking transactions, counter 233 and other administrative information.

Because the contents of SRAM 207 need to be refreshed from time to time, SRAM 207 is required to be powered by a battery (not shown) in PSD 110. For fear that the battery power should be unexpectedly lost, the ascending register value and the transaction log are redundantly stored in flash memory 209 whose contents, unlike those of SRAM 207, need not be refreshed. Flash memory 209 also contains program instructions for processor 203 to orchestrate, in concert with cryptographic engine 220, the operation of PSD 110. This operation includes generation of digital signatures for inclusion in postage indicia to be franked or printed by printer 115 on envelopes, or labels for application onto mailpieces. The digital signatures are used to authenticate the respective postage indicia.

The generation of a digital signature and subsequent verification thereof require use of the key pair—private key 236*a* and public key 236*b*—in buffer 237, in accordance with a well known public key algorithm. In a conventional manner, the pair of keys are generated mathematically. In this particular illustrative embodiment, the public key algorithm used is the Digital Signature Algorithm (DSA) described, e.g., in "Digital Signature Standard (DSS)," *FIPS PUB* 186, May 19, 1994. Cryptographic engine 220 uses private key 236*a* to sign certain postal data. The resulting digital signature, which is distinct for each postage indicium, is included in the indicium.

Unlike public key 236*b* which may be made available to the public in the postage indicium, the corresponding private key 236*a* needs to be securely stored in PSD 110. Otherwise, using private key 236*a* which is illegally obtained by, say, tampering with PSD 110, a perpetrator may fraudulently generate postage indicia without accounting for the postage expended. Thus, to prevent fraud, for example, any tampering with PSD 110 may cause the power of the battery therein to be cut off, thereby "zeroizing" or clearing some or all contents of SRAM 207, and each private key within PSD 110.

Similarly, the key pair—private key 238*a* and public key 238*b*—in buffer 239, different from the key pair in buffer 237, is used for authenticating communications with the aforementioned remote data center to set up and maintain PSD 110, and to account for the postage franked in accordance with the invention.

To keep track of the franking transactions handled by PSD 110, processor 203 maintains counter 233 in SRAM 207, which counts in an ascending order starting from zero. Processor 203 causes counter 233 to increase its count by one each time to account for a new franking transaction. Thus, the current count, denoted TID, is used to identify the franking transaction being conducted. Processor 203 also maintains transaction log 241 which records past franking transactions.

Figure 3:
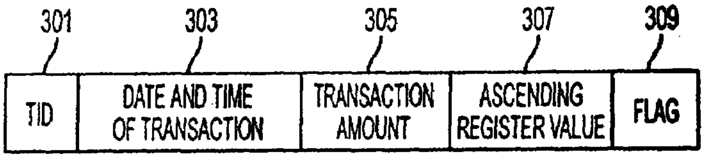
FIG. 3 illustrates a format of a franking transaction record stored in the PSD of FIG. 2.

FIG. 3 illustrates the format of each transaction record in log 241. In this instance, each transaction is identified by a TID in field 301 of the record. Field 303 contains information concerning date and time of the transaction provided by clock 205. Field 305 contains information concerning the transaction amount, i.e., the postage franked in the transaction. Field 307 contains the ascending register value as a result of the transaction. Field 309 contains a FLAG which indicates whether any ascending register "rollover" has occurred in the current transaction. An occurrence of an ascending register rollover stems from the limited number of digits that ascending register 230 can accommodate. In this illustrative embodiment, register 230 can accommodate up to 9 digits. As a result, the maximum value which can be held by register 230 is 9,999,999.99. When a value is added to the current ascending register value with the resulting sum exceeding this maximum value, an ascending register rollover would occur and the left-most digit of the resulting sum would be truncated to maintain the 9 digit limit. Thus, for example, when ascending register 230 is at 9,999,998.98, if 1.04 is added thereto, the resulting ascending register value would be 0,000,000.02 because of the rollover, instead of the supposed sum 10,000,000.02 as the left most digit "1" of the supposed sum is truncated to maintain the 9 digit limit.

When PSD 110 is initially put in service, an initial record is created in log 241. In this initial record, field 301 contains TID=0; field 303 indicates the date and time that PSD 110 is put in service; field 305 contains zero as the transaction amount since no postage has been franked; field 307 contains zero as the initial ascending register value; and field 309 contains Flag=0 indicating no ascending register rollover has occurred.

When processor 203 conducts the first franking transaction to dispense first postage in response to a user request communicated through computer 105, processor 203 causes counter 233 to increase its count from zero to one, thereby identifying the first franking transaction with TID=1. In addition, processor 203 adds the first postage value to the current ascending register value (which is zero in this instance). Processor 203 thereafter transmits to engine 220, an ensemble of information including (a) the first postage value, (b) the resulting ascending register value, and (c) a set of other postal data elements which need to be signed by engine 220 to generate a digital signature.

In response, engine 220 transmits the required digital signature to processor 203 for inclusion in a postage indicium to be printed by printer 115, thereby accomplishing the first franking transaction. Processor 203 then posts the transaction by creating a record in log 241, in accordance with the format of FIG. 3. The resulting record contains TID=1 in field 301, the date and time that the first transaction occurs in field 303, the first postage value in field 305, the updated ascending register value in field 307, and FLAG=0 in field 309 as no ascending register rollover has occurred in this transaction.

In addition, the updated value in ascending register 230 and the newly created record in log 241 are redundantly stored by processor 203 in flash memory 209.

Figure 4A:
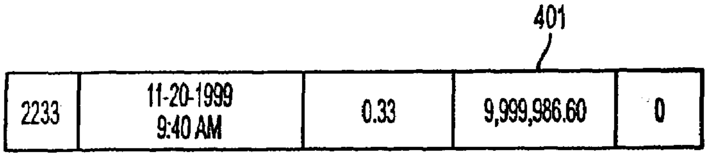
FIGS. 4A and 4B respectively illustrate franking transaction records in the format of FIG. 3.
Figure 4B:
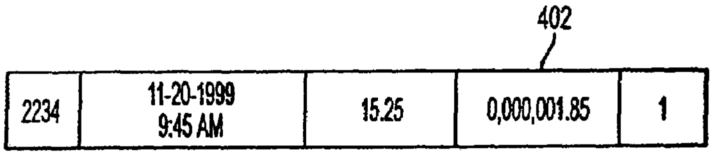

Processor 203 conducts the subsequent franking transactions and creates the corresponding records in a manner similar to the above. However, the FLAG value in field 309 of the record of a particular transaction depends on whether any ascending register rollover described above has occurred in that particular transaction. Refer now to FIGS. 4A and 4B which illustrate the records of two consecutive franking transactions by system 100, respectively. FIG. 4A illustrates transaction record 401 corresponding to transaction TID=2233. As shown in field 307 of record 401, the ascending register value resulting from the transaction is 9,999,986.60. Since no ascending register rollover has occurred in this transaction, field 309 of record 401 has Flag=0 indicating such.

FIG. 4B illustrates transaction record 402 corresponding to franking transaction TID=2234. As shown in field 305 of record 402, the postage franked or the transaction amount is 15.25. As a result, had no ascending register rollover had occurred, field 307 of record 402 would have included a supposed sum 9,999,986.60+15.25=10,000,001.85. However, this supposed sum exceeds the 9 digit limit that ascending register 230 can accommodate in this instance. As a result, an ascending register rollover occurs in this transaction and the left-most digit of the supposed sum is truncated. Thus, field 307 of record 402 contains 0,000,001.85 as the updated ascending register value. In addition, field 309 has FLAG=1 indicating the ascending register rollover occurrence in this transaction.

Figure 5:
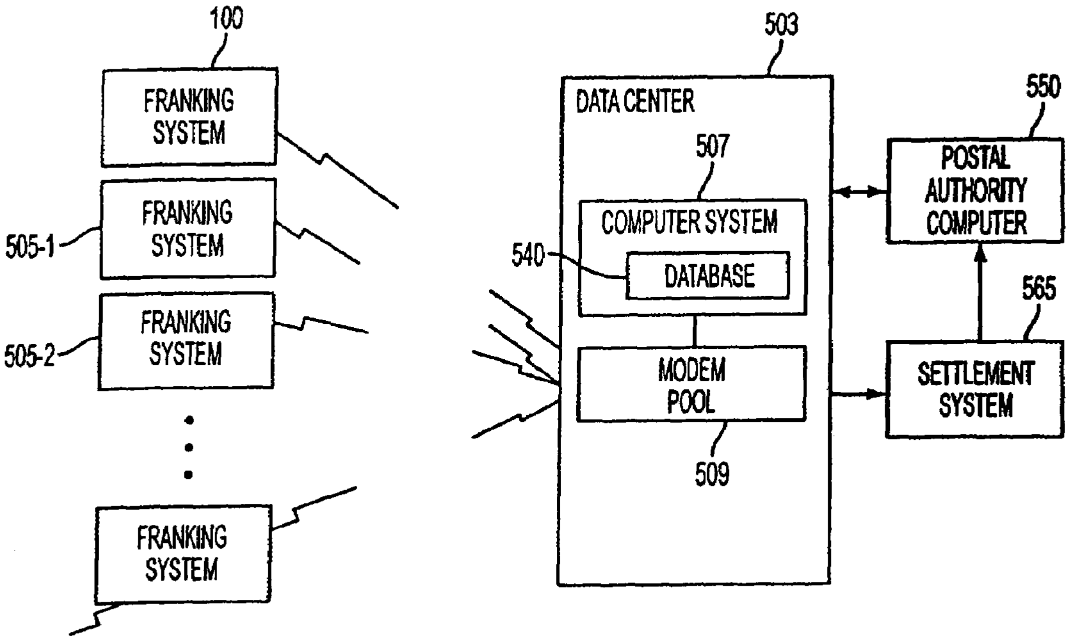
FIG. 5 illustrates a postage finance arrangement in accordance with the invention.

FIG. 5 illustrates the postage finance arrangement in accordance with the invention where data center 503 communicates with franking systems 100 and 505-1 through 505-N to, among other things, obtain therefrom franking transaction records from time to time to account for their postage consumptions, respectively, where N represents an integer greater than or equal to one. In this illustrative embodiment, each of franking systems 505-1 through 505-N is structurally identical to system 100 described above. Data center 503 comprises computer system 507 which is capable of communicating data with selected ones of franking systems 100 and 505-1 through 505-N via communication connections established by modem pool 509. These connections may be, e.g., dial-up connections, Internet connections, etc. The data communications between data center 503 and the franking systems may be in accordance with the protocol disclosed in U.S. Pat. No. 5,715,164 issued Feb. 3, 1998 to Liechti et al.

In this illustrative embodiment, computer system 507 initiates communications with franking systems 100 and 505-1 through 505-N periodically to obtain the respective transaction records, from which the postage consumptions for the period is derived in a manner described below. Such postage consumptions are then accounted for by charging same to the accounts associated with the franking systems, where such accounts may be checking accounts, debit accounts, credit accounts, revolving credit accounts, prefunded accounts, escrow accounts, etc., held by one or more financial institutions. To that end, system 507 maintains database 540 therein, which contains financial account records concerning the respective franking systems served by data center 503. Alternatively, database 540 may be remote from data center 503.

Figure 6:
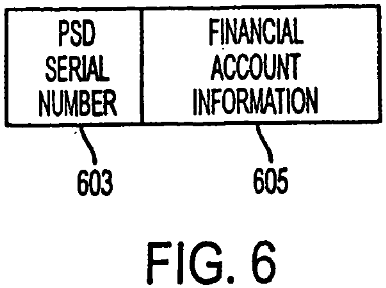
FIG. 6 illustrates a format of a financial account record stored in a computer system in the arrangement of FIG. 5.

FIG. 6 illustrates the format of each financial account record in database 540. In this instance, each franking system is identified by a PSD serial number in field 603 pre-assigned to its PSD. Field 605 contains information concerning the financial account associated with the franking system, which includes a financial account number, and data identifying the financial institution with which the account is maintained.

Since the number of franking systems served by data center 503 may be significant and their geographic locations, and thus the time zones they are in, may be very different, computer system 507 may not communicate with all of the franking systems at the same time. Rather, computer 507 communicates with the franking systems in a staggered manner. Preferably, the communication with each franking system takes place between the last mail pick-up of the day in the area where the franking system resides and the first mail pick-up of the following day in that area.

Thus, for example, let's say the last mail pick-up on each business day in the area where franking system 100 resides is at 5 p.m. (local time) and the first mail pick-up is at 8 a.m. the following business day. Computer system 507 may be programmed to communicate with system 100 between 5 p.m. each business day and 8 a.m. the following business day, e.g., 5:20 p.m. That is, at 5:20 p.m. each business day, computer system 507 initiates communications with system 100 to obtain those records in transaction log 241 having field 303 time-stamped after 5 p.m. of the previous business day up to 5 p.m. of the current business day. Even though system 100 may be used to frank additional postage after 5 p.m. of the day, such postage has not been "earned" by the postal authority as no postal service has been rendered thereby after 5 p.m. that day, and not until 8 a.m. the following day. In any event, such additional franked postage would be picked up by computer system 507 in the next reporting cycle. Thus, the present postage finance arrangement advantageously accounts for the expended postage for which postal service has been rendered.

It should be noted that if the mail pick-up times concerning a franking system vary, e.g., from day to day, the schedule of communications with the franking system can be programmed accordingly in computer system 507 to realize the present postage finance arrangement.

Continuing the above example, without loss of generality, computer system 507 is programmed to initiate a communication connection with franking system 100 at 5:20 p.m. on each business day. Through such a communication connection, computer system 507 requests from franking system 100 those transaction records in the current reporting cycle, i.e., those records time-stamped after 5 p.m. of the previous business day up to 5 p.m. of the current business day. In response, processor 203 in system 100 retrieves the transaction records in question from transaction log 241. The retrieved transaction records are then cryptographically signed and/or encrypted by cryptographic engine 220. In this instance, these records are cryptographically signed using private key 238*a* in buffer 239, in accordance with a well known data authentication algorithm, e.g., the DSA. The signed transaction records are transmitted to computer system 507 through the established communication connection.

Figure 7:
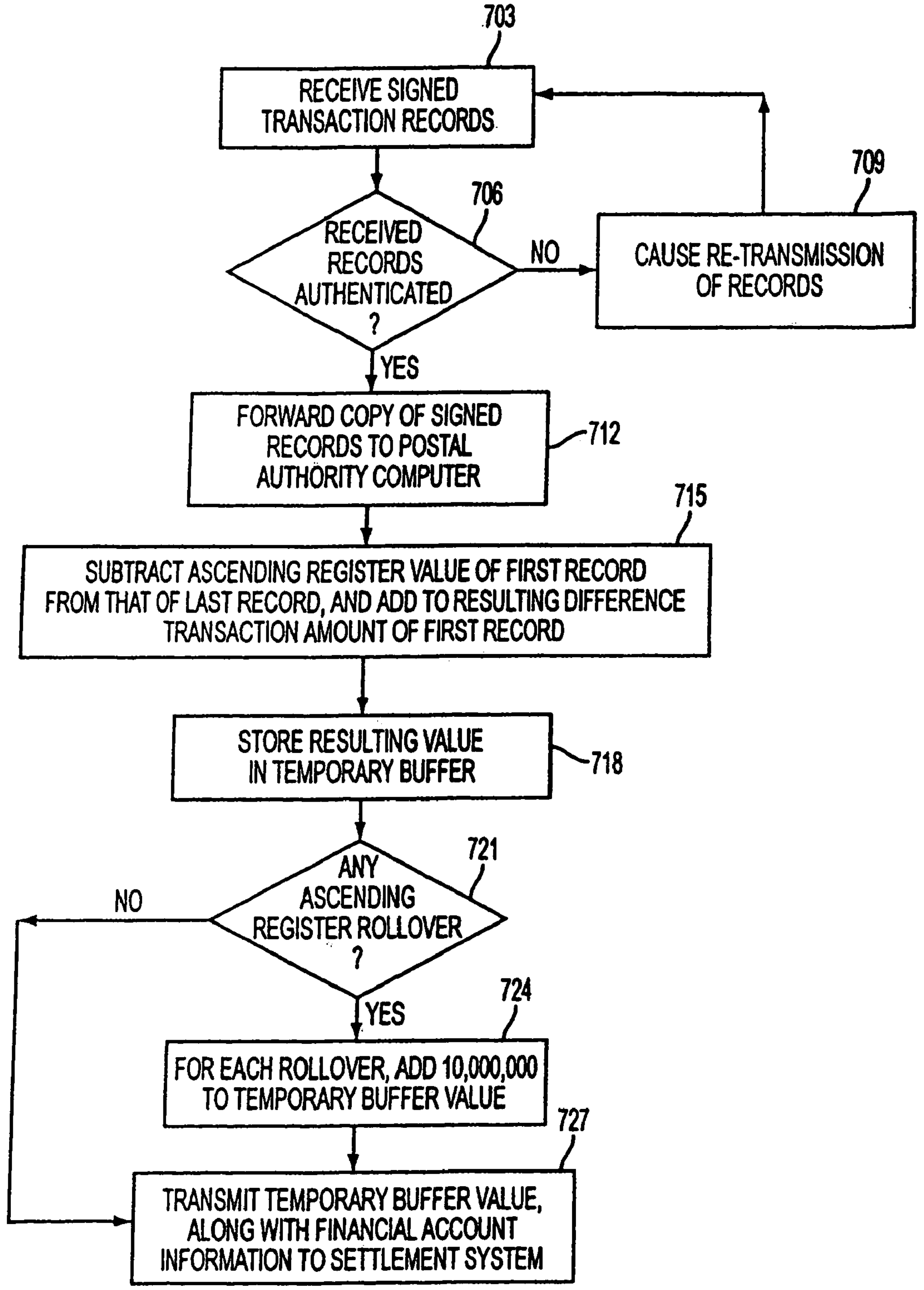
FIG. 7 illustrates a process performed by the computer system for effecting postage finance in accordance with the invention.

After computer system 507 receives the signed transaction records from franking system 100, as indicated at step 703 in FIG. 7, system 507 in a well known manner uses public key 238*b*, a copy of which was provided thereto earlier, to authenticate the received records, as indicated at step 706. If the received records cannot be authenticated, system 507 at step 709 causes franking system 100 to re-transmit the signed records in question. However, a predetermined limit on the number of allowable re-transmissions is imposed. When such a limit is exceeded, computer system 507 may cause franking system 100 to shut down until it is satisfactorily audited and re-started by authorized personnel.

Otherwise, if the received transaction records are authenticated, computer system 507 at step 712 forwards a copy of the signed transaction records received from system 100 to postal authority computer 550 for storage and analysis purposes. Computer system 507 then computes the total postage incurred in the franking transactions based on the received records. It should be noted that the received records are in chronological order, with the first record time-stamped earliest in the current reporting cycle. At step 715, system 507 subtracts the ascending register value in field 307 of the first received record from that of the last received record, and adds to the difference the transaction amount in field 305 of the first received record. The resulting value is stored in a temporary buffer (not shown) in SRAM 207, as indicated at step 718. Such a value would equal the postage franked during the current reporting cycle, provided that no ascending register rollover occurred during such a cycle. Computer system 507 at step 721 determines any such rollover by identifying any FLAG=1 in field 309 of the received records. If one or more of the records have FLAG=1, for each rollover, computer system 507 at step 724 adds 10,000,000 to the value in the temporary buffer to obtain the correct postage franked during the cycle. In any event, computer system 507 at step 727 transmits the resulting temporary buffer value, representing the postage franked during the cycle to settlement system 565, along with the financial account information associated with system 100.

In response, settlement system 565 causes transfer of funds in the amount of the franked postage from the financial account associated with franking system 100 to a predetermined postal authority account. System 565 then sends to postal authority computer 550 a message indicating the completion of the funds transfer.

Postal authority computer 550 may analyze and/or audit the franking transaction records of franking system 100 for any reporting cycle, which were forwarded thereto by data center 503, to verify whether the amount of the funds transferred to the postal authority account matches the postage consumed by system 100 in that cycle. Specifically, computer 550 may retrieve from its storage the franking transaction records of system 100 of a selected reporting cycle. Computer 550 first uses public key 238*b*, a copy of which was provided thereto earlier, to authenticate the retrieved records. After the records are authenticated, computer 550 may retrace the franking transactions in the reporting cycle by going through the records one by one in chronological order. In particular, computer 550 examines field 305 and field 307 of each transaction record, which indicate the corresponding franking transaction amount, and the resulting ascending register value, respectively. Computer 550 then determines whether the ascending register value properly takes into account the transaction amount in the same record. If it does not, system 100 fails the audit. In that case, computer 550 generates an exception report concerning system 100 and transmits same to data center 503. Upon receiving the exception report, data center 503 causes system 100 to shut down until it is satisfactorily audited and re-started by authorized personnel.

Figure 8:
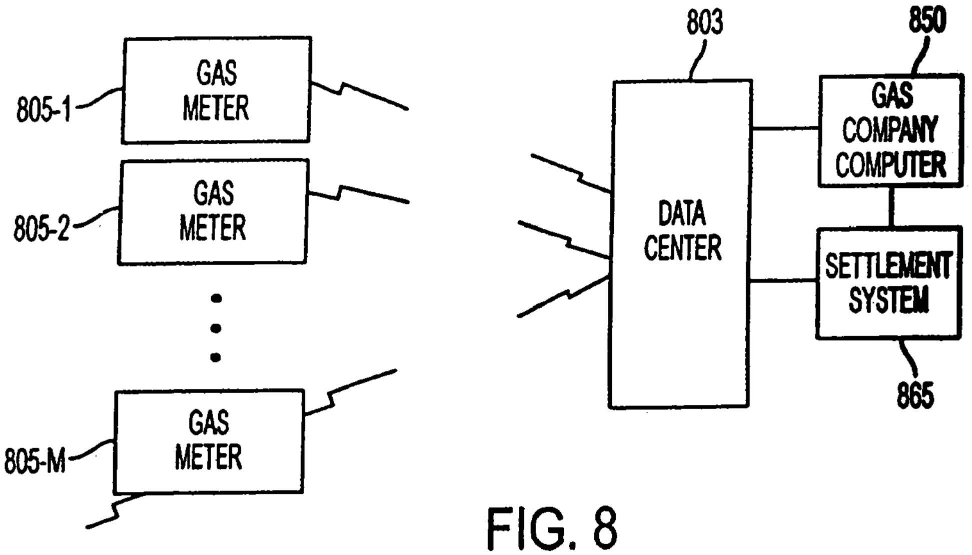
FIG. 8 illustrates a finance arrangement to account for consumption of a resource provided by a company in accordance with the invention.

The above-described postage finance arrangement in accordance with the invention may be readily modified to account for resource consumptions in general. For example, FIG. 8 illustrates an arrangement which, similar to the arrangement of FIG. 5, may be used to account for gas consumptions by customers of a natural gas company. Similar to data center 503, data center 803, which is operated and maintained by a resource consumption reporting company, from time to time communicates with gas meters 805-1 through 805-M in accordance with a predetermined protocol. In this instance, gas meters 805-1 through 805-M are structurally identical, and reside on customer premises to measure and report gas consumptions by the customers, respectively, where M represents an integer greater than one.

Figure 9:
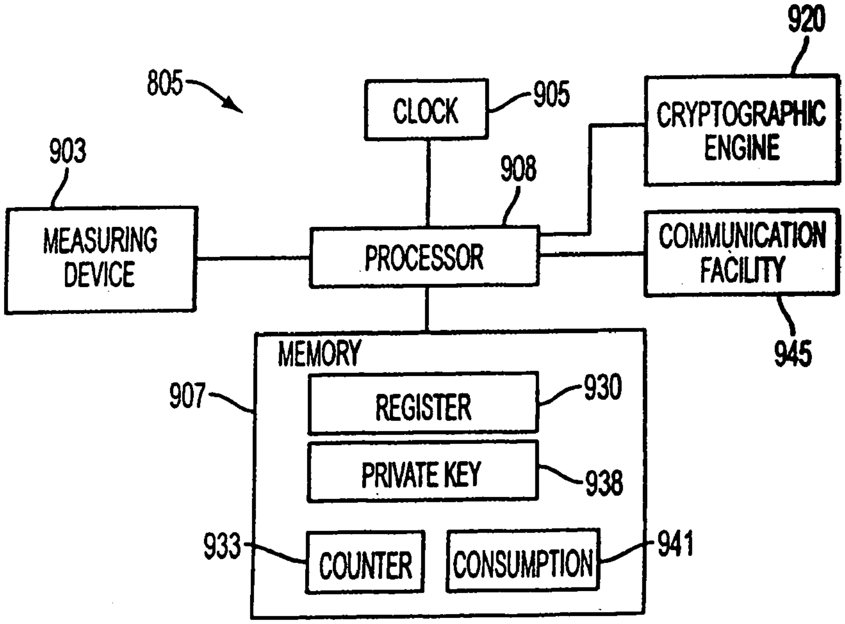
FIG. 9 is a block diagram of a meter for reporting the resource consumption.

FIG. 9 illustrates one such gas meter, generically denoted 805. As shown in FIG. 9, meter 805 includes measuring device 903 which measures the amount of gas consumed by the customer associated therewith. Like PSD 110, meter 805 also includes memory 907 similar to SRAM 207, clock 905 similar to clock 205, and cryptographic engine 920 similar to cryptographic engine 220. Memory 907 comprises counter 933 similar to counter 233, and register 930 similar to ascending register 230 to keep track of the amount of gas consumed. Processor 908 creates consumption records periodically, e.g., once every 15 minutes, to account for the gas consumptions in the corresponding periods. The format of each consumption record is similar to that of FIG. 3, although the field corresponding to field 305 contains information concerning the amount of gas consumed in the corresponding period instead of a transaction amount. The consumption records, thus created, constitute consumption log 941 in memory 907. The records may be cryptographically signed before they are communicated to data center 803 through communication facility 945 which includes, e.g., a modem. To that end, memory 907 includes at least private key 938 for use by cryptographic engine 920 to cryptographically sign the consumption records, in accordance with a public key algorithm, e.g., the DSA. Copies of the public key corresponding to private key 938 are provided beforehand to data center 803 and gas company computer 850 for authenticating the consumption records communicated by meter 805.

Like data center 503, data center 803 polls each of gas meters 805-1 through 805-M for consumption records of each reporting cycle. Data center 803 then receives and processes the records in accordance with a routine similar to that of FIG. 7. Data center 803 computes the charges for the gas consumption during the reporting period, and transmits the computed charges and the financial account information associated with the gas meter to settlement system 865. Like settlement system 565, settlement system 865 causes transfer of funds covering such charges from the financial account associated with the gas meter to a predetermined gas company account. System 865 then sends to gas company computer 850 a message indicating the completion of the funds transfer.

Like postal authority computer 550, gas company computer 850 may audit the gas consumption records of a gas meter for any reporting cycle, which were forwarded thereto by data center 803. In addition, computer 850 may analyze the received consumption records to obtain statistics concerning relative gas demands in different geographic areas served by the natural gas company. Based on such statistics, computer 850 may effectively manage the supply of gas from its limited sources to the different geographic areas according to their demands. To that end, computer 850 may control the gas transport to direct calculated amounts of gas to the respective areas. Thus, with the inventive arrangement, the shorter is the reporting cycle, the closer the gas distribution to customers to a just-in-time fashion.

Figure 10:
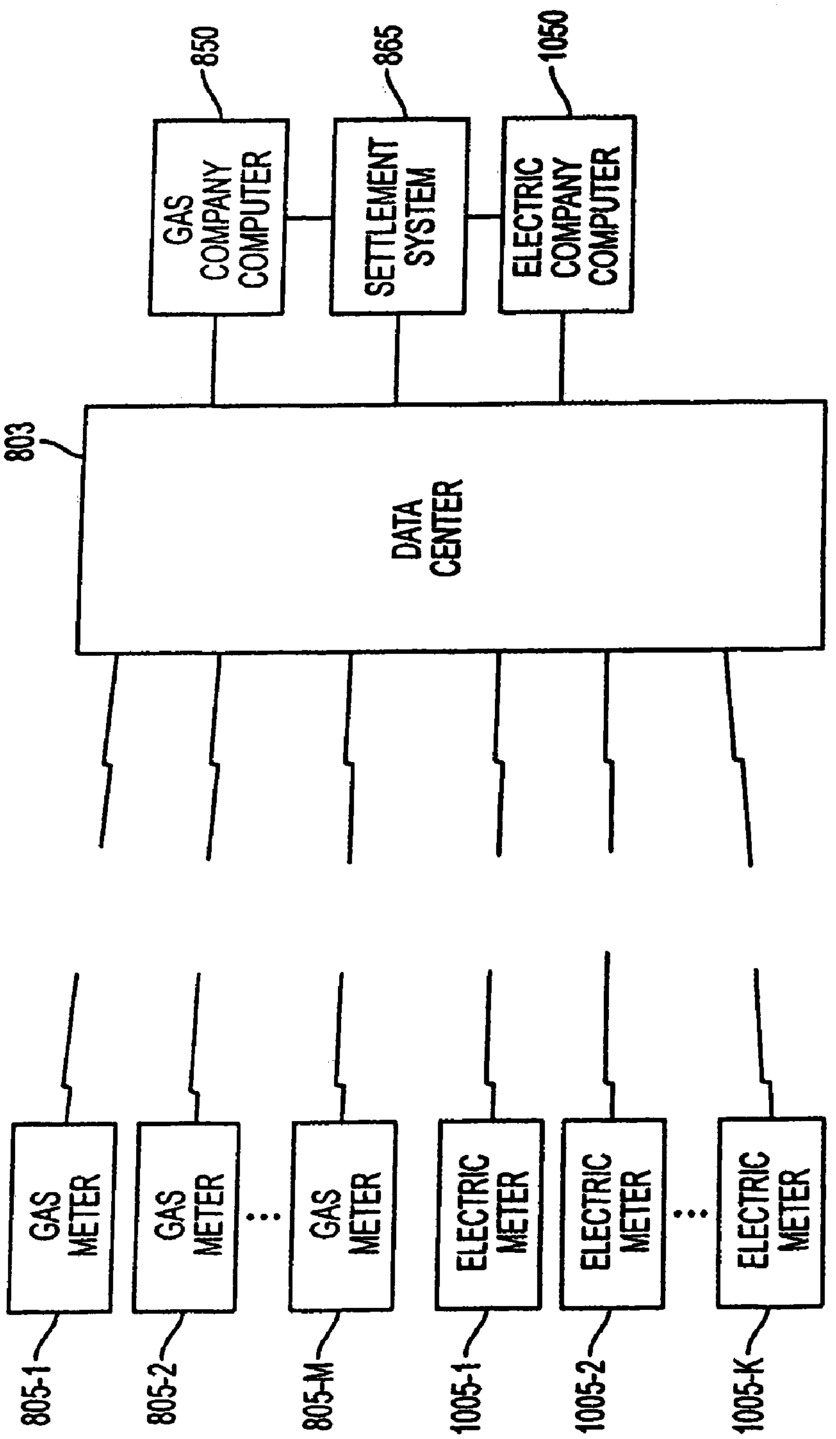
FIG. 10 illustrates a finance arrangement to account for consumptions of different resources provided by more than one company in accordance with the invention.

It should be noted that data center 803 may serve more than one provider providing resources to effect the finance arrangement in accordance with the invention. FIG. 10 illustrates one such arrangement where data center 803 serves a gas company and an electric company to account for the gas consumptions and electric consumptions by their customers, respectively. As shown in FIG. 10, apart from gas meters 805-1 through 805-M, electric meters 1005-1 through 1005-K, which are designed similarly to meter 805, communicate records of electric consumptions to data center 803 in accordance with the predetermined protocol, where K represents and integer greater than one. Data center 803 computes the charges for the respective gas and electric consumptions, and causes settlement system 865 to transfer funds covering such charges from the customer accounts to the predetermined gas company and electric company accounts, respectively. In addition, gas company computer 850 and electric company computer 1050 may audit and/or analyze the consumption records forwarded thereto by data center 803.

Based on the disclosure heretofore, it is apparent that the arrangement of FIG. 10 can be expanded to serve many different resource providers as long as the devices measuring the resource consumptions are capable of communicating consumption records to data center 803 in accordance with the predetermined protocol. Of course, one such resource provider may be a postal authority providing a postal service described before. Thus, it is apparent that data center 803 may communicate with franking systems similar to system 100 described before, a well as utility meters similar to meter 805, in accordance with the same predetermined protocol to effect the inventive finance arrangement.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, certain communication data is cryptographically signed for authentication purposes. It will be appreciated that such data may be cryptographically encrypted and/or signed.

In addition, in the disclosed embodiment, the DSA is illustratively used to perform data authentication, another well-known data authentication algorithm such as the RSA or Elliptic Curve algorithm may be used, instead.

Further, in the disclosed embodiment, franking system 100 is configured as an open system. It will be appreciated that the franking system may be configured as a closed system in the form of a postage meter including therein a dedicated printer.

Finally, PSD 110 and meter 805 are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

The invention claimed is:

1. An apparatus for accounting for the consumption of postal resources comprising:

a memory for providing a value indicative of the consumption of postal resources, the memory includes only a non-resettable ascending register and no descending register;

a processor for generating at least one record including data related to the consumption of the postal resources;

an output device for transmitting the at least one record related to the consumption of the postal resources to a data center, characterized in that said output device transmits said at least one record responsive to a request from the data center for the at least one record; and a settlement center adapted to receive a request for funds transfer from the data center based on the at least one record and to arrange for a transfer of corresponding user funds from a user account to a postal authority account, and to notify said data center that the transfer had been made;

wherein there is no prepayment of postage funds by the user and the user is billed based on the value indicative of the consumption of postal resources provided by the memory.

2. The apparatus of claim 1 further comprising said memory including an ascending register and no descending register.

3. The apparatus of claim 1 wherein the consumption of the postal resources includes postage dispensed for the utilization of a postal service.

4. The apparatus of claim 3 further comprising a controller for generating at least part of a postage indicium.

5. The apparatus of claim 1 wherein each record is associated with a different transaction of postage dispensation.

6. The apparatus of claim 1 wherein a postal security device is used to dispense postal indicia and the memory monitors the value of the postal indicia dispensed and the processor uses the value of the postal indicia dispensed and at least a time that each postal indicia is dispensed to generate the at least one record.

7. The apparatus of claim 6 wherein the postal security device includes only an ascending register to monitor postal indicia dispensed.

8. The apparatus of claim 6 wherein the postal security device does not include a descending register adapted to monitor a level of funds remaining available for a dispensing of postal indicia.

9. The apparatus of claim 1 wherein the data center is adapted to communicate with more than one system providing postal resources.

10. The apparatus of claim 9 wherein each system is a franking system adapted to generate postal indicia and the data center receives records from each franking system reflecting a value of postal indicia generated.

11. The apparatus of claim 10 wherein each franking system does not store funds for generating postal indicia.

12. The apparatus of claim 10 wherein the data center controls each franking system's ability to generate postal indicia based on an indication from the settlement center that a funds transfer has been made.

13. A system for assessing charges for consumptions of at least first and second different resources, the system comprising:

a communication apparatus for communicating with at least first and second devices, the first device providing a first measure of consumption of the first resource, the second device providing a measure of consumption of the second, different resource, the first device and second device each having only a nonresettable ascending register and no descending register, the first and second resource providing funds for dispensing postage;

a processor for determining first charges based on the first measure of consumption of the first resource, and second charges based on the second measure of consumption of the second, different resource;

a transmitter for providing first information concerning the first charges and a first user account associated with the first device, and second information concerning the second charges and a second user account associated with the second device for settlement of the first and second charges; and a settlement center adapted to receive a request for funds transfer from a postage data center based on at least one record related to the consumption of the postal resources and to arrange for a transfer of corresponding user funds from a user account to postal authority account, and to notify said data center that the transfer had been made;

wherein there is no prepayment of postage funds by a user of at least first and second devices and the user is billed based on the a measure of consumption provided by a respective one of the at least first or second devices.

14. The system of claim 13 wherein the first and second resources include different utility resources.

15. The system of claim 13 wherein the first resource includes a postal service.

16. The system of claim 15 wherein the second resource includes a utility resource.

17. The system of claim 16 wherein the utility resource is a natural gas resource.

18. The system of claim 16 wherein the utility resource is an electric resource.

19. The system of claim 15 wherein the first device provides at least an amount of postage dispensed for the postal service.

20. The system of claim 15 wherein the first device includes a processor for generating at least part of a postage indicium.

21. The system of claim 15 wherein the first device includes a controller for generating at least part of a postage indicium.

22. A method for use in an apparatus for processing charges for consumption of postal resources the method comprising:

forming at least one nonresettable record in memory of a postage dispensing device indicating a value of the postal resource consumed, wherein the memory only including a non-resettable ascending register and no descending register and the memory only including records of the postal resources consumed;

electronically transmitting at least one of the records of the postal resources consumed to a data center for processing;

electronically transmitting a request for payment of the consumed postal resources from the data center to a settlement center wherein a transfer of funds is effected between a user's account and a postal authority account; and electronically notifying the data center that the funds transfer is made;

wherein there is no prepayment of postage funds by the user and the user is billed based on the value indicative of the consumption of postal resources provided by the memory.

23. The method of claim 22 wherein each record also includes an indicator indicative of a truncation of the value.

24. The method of claim 22 wherein the consumption of the resource includes utilization of a postal service, and the individual measure includes postage dispensed for the utilization of the postal service.

25. The method of claim 24 wherein each record is associated with a different transaction of postage dispensation.

26. The method of claim 25 wherein the time information in each record is indicated by an index identifying the transaction associated with the record.

27. The method of claim 25 wherein the time information in each record concerns a time of the transaction associated with the record.

28. The method of claim 24 further generating at least part of a postage indicium.

29. The method of claim 22 wherein the consumption includes a utility consumption.

30. The method of claim 22 further comprising the transfer of funds being effected between the user's account and an account associated with the postal resource in a staggered manner.

31. The method of claim 22 wherein the forming of at least one record comprises retrieving a value of postal indicia generated from an ascending register of a postal security device.

32. The method of claim 31 wherein the postal security device does not include a register of funds available for generating postal indicia and receives authority to generate postal indicia from the data center.

33. The method of claim 22 wherein the data center receives records from a plurality of postal resource systems and sorts the records based on each respective postal resource system.

34. The method of claim 22 wherein the data center controls an ability of each postal resource to dispense postal resources.

35. The method of claim 22 further comprising communicating a payment record to a postal authority detailing each postage indicia generation transaction for verification, wherein the postal authority is adapted to audit the payment record.

36. A method for use in an arrangement for processing charges for consumptions of at least one resource, the consumptions being measured using a plurality of devices, each device being associated with a different user financial account, the arrangement including a first system for settlement of charges and a second system for storage of at least one nonresettable record from each device, the method comprising:

forming the at least one nonresettable record from each device, each record including at least a measure of a consumption of the resource, wherein each device only including a non-resettable ascending register and no descending register;

determining, for each device, charges for the consumption of the resource based on a subset of the records received from the device; and transmitting, for each device, the charges and information concerning the user financial account associated with the device to the first system for settlement of the charges, and for transmitting the at least one record associated with the device to the second system for storage and effecting a transfer of funds between the user financial account and a postal authority account;

wherein there is no prepayment of postage funds by the user and the user is billed based on the measure of a consumption of the resource of a respective device.

37. The method of claim 36 further comprising re-allocating the resource based on statistics derived from the records stored in the second system.

38. The method of claim 36 wherein the measure of the consumption of the resource in each record includes an amount of individual postage dispensed for utilization of a postal service.

39. The method of claim 38 wherein each record also includes a value indicative of cumulative postage dispensed, the value taking into account the amount of the individual postage in the record.

40. The method of claim 39 wherein each record also includes an indicator indicative of a truncation of the value.

41. The method of claim 38 wherein each record is associated with a different transaction of postage dispensation.

42. The method of claim 36 wherein the plurality of records include more than two records, and the subset of the records includes two selected records.

43. The method of claim 36 wherein the resource includes a utility resource.

44. The method of claim 36 further comprising cryptographically processing the plurality or records.

45. The method of claim 44 wherein the plurality of records are cryptographically signed to authenticate the records.

46. A method for use in a system for assessing charges for consumptions of at least first and second different resources, the system including at least first and second devices, the first device providing a first nonresettable measure of consumption of the first resource, the second device providing a second nonresettable measure of consumption of the second, different resource, the method comprising:

receiving from the first device the first nonresettable measure of consumption of the first resource, and from the second device the second nonresettable measure of consumption of the second, different resource, the first device and the second device each including only a non-resettable ascending register and no descending register;

determining first charges based on the first measure of consumption of the first resource and second charges based on the second measure of consumption of the second, different resource; and providing first information concerning the first charges and a first user account associated with the first device, and second information concerning the second charges and a second user account associated with the second device for settlement of the first and second charges;

wherein there is no prepayment of postage funds by the user and the user is billed based on the measure of a consumption of a respective one of the first device or second device.

47. The method of claim 46 wherein the first and second resources include different utility resources.

48. The method of claim 46 wherein the first resource includes a postal service.

49. The method of claim 48 wherein the second resource includes a utility resource.

50. The method of claim 49 wherein the utility resource is a natural gas resource.

51. The method of claim 49 wherein the utility resource is an electric resource.

52. The method of claim 48 wherein the first charges include an amount of postage dispensed for the postal service.

* * * * *

UNITED STATES PATENT AND TRADEMARK OFFICE

CERTIFICATE OF CORRECTION

PATENT NO. : 7,120,610 B1

APPLICATION NO. : 09/914753

DATED : October 10, 2006

INVENTOR(S) : George M. Brookner et al.

It is certified that error appears in the above-identified patent and that said Letters Patent is hereby corrected as shown below:

On the Title Page, item 86 under "§ 371 (c)(1)," insert: --claims benefit of U.S. Application No. 60/122,826 filed on March 4, 1999.--

Item 56 under "OTHER PUBLICATIONS", after "Office Systems" change "v11n9, pp.32-40" to --v. 11, n. 9, Sep. 1994, pp. 32-40--.

| Column | Line | |
|---|---|---|
| 1 | 10 | After "WO 00/52614" insert --on Sep. 8, 2000, and also claims the benefit of U.S. Application Serial No. 60/122,826, filed on March 4, 1999--. |
| 9 | 51 | Change "and integer" to --an integer--. |
| 12 | 13 | After "resources" insert --,--. |

Signed and Sealed this

Twenty-fourth Day of April, 2007

JON W. DUDAS

*Director of the United States Patent and Trademark Office*